July 24, 1923.

E. EDLER 1,462,636

HIGH PRESSURE SLIDE STOP VALVE WITH PARALLEL STEAM TIGHT SURFACES

Filed Oct. 26, 1921

Patented July 24, 1923.

1,462,636

UNITED STATES PATENT OFFICE.

EDUARD EDLER, OF LEIPZIG-LINDENAU, GERMANY, ASSIGNOR, BY MESNE ASSIGNMENTS, TO ALBERT KARL ISELER AND ALBERT GEORG WILHELM ISELER, BOTH OF LEIPZIG-PLAGWITZ, GERMANY.

HIGH-PRESSURE SLIDE-STOP VALVE WITH PARALLEL STEAM-TIGHT SURFACES.

Application filed October 26, 1921. Serial No. 510,619.

*To all whom it may concern:*

Be it known that I, EDUARD EDLER, a citizen of the German Republic, residing at Leipzig-Lindenau, Germany, have invented certain new and useful Improvements in High-Pressure Slide-Stop Valves with Parallel Steam-Tight Surfaces, of which the following is a specification.

Figure 1:
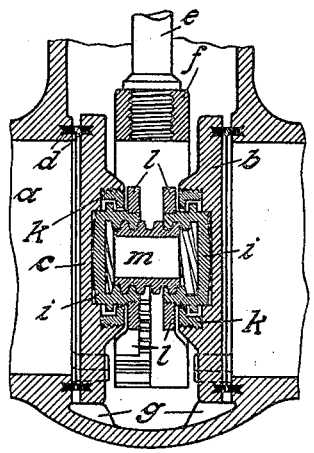

The improvements according to this invention have for their object to ensure that when the stop valve is being opened, the obturating disks $b$ and $c$ shown in the prior application Serial Number 425220 are moved away perpendicularly from the packing- or seating-rings $d$ in the housing $a$, before the lifting movement proper is effected and that at the closing they are perpendicularly moved towards said rings $d$ and settle down upon the same without friction when the movement is terminated. The obturating disks are further connected with the parts, which control the axial displacement and the lifting and lowering, in such a manner that they can revolve freely independently of these parts. This effect is obtained by the form of construction of the obturating slides which will be hereinafter fully described with reference to the accompanying drawings, wherein:

Fig. 1 is a front elevation.

Figure 2:
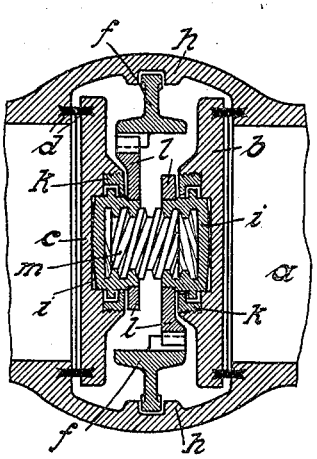

Fig. 2 a side elevation, and

Figure 3:
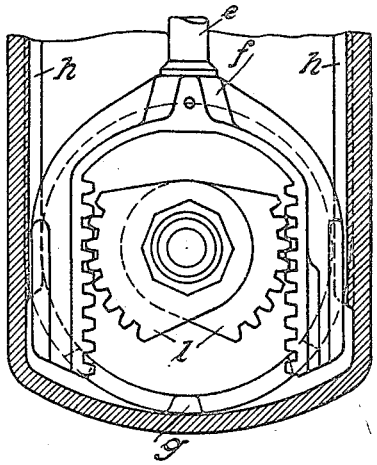

Fig. 3 a plan view of the first form of construction.

The seating rings $d$ are fixed in the well known manner in the obturating disks $b$ and $c$, said disks having upon the sides opposite the seating rings $d$ at the center each two cavities, the larger one of which is threaded. The cylindrical extension of an internally threaded nut $i$ fits into the small cavity. The externally threaded rings $k$ which overlap the nuts $i$ secure the same in axial position with regard to the obturating disks. With this object in view the nuts $i$ have each a collar which engages with some play in the bottom part of the corresponding ring $k$, so that the nuts can freely turn in the obturating disks, being however secured against displacement in axial direction. The two nuts $i$ with their obturating disks $b$ and $c$ are screwed together by the screw bolt $m$.

The operation of the improved slide is as follows:—

When the slide is being opened the yoke $f$ connected with the screw spindle $e$ moves upwards and makes the nuts $i$ revolve in opposite directions so that the obturating disks $b$ and $c$ are moved the one towards the other, whereby the seating rings $d$ are moved the one away from the other perpendicularly until the obturating disks $b$ and $c$ come in contact with the sides of the yoke $f$. When this yoke continues to ascend it draws along the obturating disks $b$ and $c$ which now participate in the lifting movement as the teeth of the racks are still in gear with the teeth of the segments $l$.

At the closing of the slide the yoke descends. The obturating disks $b$ and $c$ come in contact with the stops $g$ as soon as the seating rings $d$ stand centrically the one in front of the other. When now the descent of the yoke $f$ continues the obturating disks are moved away the one from the other owing to the nuts being revolved in opposite directions, whereby the seating rings are strongly pressed together.

I claim:—

1. An improved high pressure slide stop valve with parallel steam-tight surfaces comprising in combination with the housing, the seating rings in said housing, the valve spindle and a yoke operated from said valve spindle and having teeth at its two sides, two obturating disks the one opposite the other having each a cavity at the center, seating rings in said obturating disks opposite said seating rings of the housing, an internally threaded nut in each of said cavities projecting from the inner surface of the corresponding obturating disk, means for securing said nuts in said cavities so that they can freely revolve but are prevented from axial displacement, a screw bolt connecting said nuts, and one-armed levers on the freely projecting rims of said nuts forming together a toothed segment for each nut adapted to be operated from the corresponding teeth of said yoke so that at the beginning and end of the ascent and descent of said yoke said obturating slides are first moved towards or away from each other before the teeth of the yoke begin to act upon the toothed segments and to raise or lower said obturating disks.

2. An improved high pressure slide stop valve with parallel steam-tight surfaces comprising in combination with the housing, the seating rings in said housing, the valve spindle and a yoke operated from said valve spindle and having teeth at its two sides, two obturating disks the one opposite the other having each two concentric cavities at the center, seating rings in said obturating disks opposite said seating rings of the housing, an internally threaded nut in each of the inner concentric cavities projecting from the inner surface of the corresponding obturating disk, a collar upon the outer surface of each nut, a ring screwed into the outer of said concentric cavities and overlapping the collar of the corresponding nut so that this nut can freely revolve in its seat but is prevented from displacement in axial direction, a screw bolt connecting said nuts, and one-armed levers on the freely projecting rims of said nuts forming together a toothed segment for each nut adapted to be operated from the corresponding teeth of said yoke so that at the beginning and end of the ascent and descent of said yoke said obturating slides are first moved towards or away from each other before the teeth of the yoke begin to act upon the toothed segments and to raise or lower said obturating disks.

In testimony whereof I affix my signature in presence of two witnesses.

EDUARD EDLER.

Witnesses:
 CARL SCHMIDT,
 HERMANN PETZOLD.